United States Patent
Nilsson et al.

(10) Patent No.: US 9,693,369 B2
(45) Date of Patent: Jun. 27, 2017

(54) RADIO COMMUNICATION IN UNLICENSED BAND

(71) Applicant: Telefonaktiebolaget L M Ericsson (publ), Stockholm (SE)

(72) Inventors: Thomas Nilsson, Malmo (SE); Niklas Andgart, Sodra Sandby (SE); Fredrik Nordstrom, Lund (SE); Yngve Selen, Uppsala (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 28 days.

(21) Appl. No.: 14/655,313

(22) PCT Filed: Jan. 10, 2014

(86) PCT No.: PCT/EP2014/050370
§ 371 (c)(1),
(2) Date: Jun. 24, 2015

(87) PCT Pub. No.: WO2014/111309
PCT Pub. Date: Jul. 24, 2014

(65) Prior Publication Data
US 2015/0327297 A1 Nov. 12, 2015

Related U.S. Application Data

(60) Provisional application No. 61/766,942, filed on Feb. 20, 2013.

(30) Foreign Application Priority Data

Jan. 16, 2013 (EP) .................................. 13151496

(51) Int. Cl.
*H04W 74/08* (2009.01)
*H04W 72/12* (2009.01)
(Continued)

(52) U.S. Cl.
CPC ..... *H04W 74/0816* (2013.01); *H04W 52/244* (2013.01); *H04W 72/1215* (2013.01);
(Continued)

(58) Field of Classification Search
CPC ..... H04W 88/06; H04W 16/14; H04W 84/12; H04W 36/14; H04W 48/18
See application file for complete search history.

(56) References Cited

U.S. PATENT DOCUMENTS

2009/0122765 A1* 5/2009 Dimou .................. H04W 88/06
370/336
2009/0180451 A1* 7/2009 Alpert ............... H04W 72/1215
370/338
(Continued)

FOREIGN PATENT DOCUMENTS

GB         2486926 A      7/2012
WO     2012/057590 A2     5/2012
(Continued)

OTHER PUBLICATIONS

PCT International Search Report, mailed Feb. 28, 2014, in connection with International Application No. PCT/EP2014/050370, all pages.
(Continued)

*Primary Examiner* — Jung Park
(74) *Attorney, Agent, or Firm* — Leffler Intellectual Property Law, PLLC

(57) ABSTRACT

The present disclosure relates to a method of a first radio device using a first radio access technology, RAT, for communication with a second radio device. The method comprises listening for any transmission in a frequency channel of an unlicensed radio frequency band. The method also comprises determining whether the channel is idle. The method also comprises transmitting a first radio message on
(Continued)

the channel in accordance with a second RAT, different than the first RAT. The method also comprises determining transmission properties for a message to be transmitted on the channel in accordance with the first RAT, based on the determining of whether the channel is idle. The method also comprises transmitting a second radio message on the channel, to the second radio device and in accordance with the first RAT using the determined transmission properties.

13 Claims, 5 Drawing Sheets

(51) Int. Cl.
  *H04W 52/24* (2009.01)
  *H04W 84/12* (2009.01)
  *H04W 84/04* (2009.01)
(52) U.S. Cl.
  CPC .... *H04W 72/1226* (2013.01); *H04W 74/0808* (2013.01); *H04W 84/042* (2013.01); *H04W 84/12* (2013.01)

(56) References Cited

U.S. PATENT DOCUMENTS

| | | | |
|---|---|---|---|
| 2012/0071103 A1 | 3/2012 | Kadous et al. | |
| 2014/0044105 A1* | 2/2014 | Bontu | H04L 5/001 370/336 |

FOREIGN PATENT DOCUMENTS

| | | |
|---|---|---|
| WO | 2012/088270 A1 | 6/2012 |
| WO | 2012/096949 A1 | 7/2012 |
| WO | 2012/108711 A2 | 8/2012 |
| WO | 2012/135491 A1 | 10/2012 |

OTHER PUBLICATIONS

PCT Written Opinion, mailed Feb. 28, 2014, in connection with International Application No. PCT/EP2014/050370, all pages.

Ratasuk, R. et al. "License-exempt LTE deployment in heterogeneous network", 2012 IEEE International Symposium on Wireless Communication Systems (ISWCS), Aug. 28, 2012, pp. 246-250, XP032263759, ISBN: 978-1-4673-0761-1.

Beluri, M. et al. "Mechanisms for LTE coexistence in TV white space" 2012 IEEE International Symposium on Dynamic Spectrum Access Networks (DYSPAN), Oct. 16, 2012, pp. 317-326, XP032372357, ISBN: 978-1-4673-4447-0.

3GPP TS 36.213 V11.0.0 "Evolved Universal Terrestrial Radio Access (E-UTRA); Physical layer procedures (Release 11)" Sep. 2012, Section 5.2, pp. 1-143.

IEEE 80211-2012 Part 11: Wireless LAN Medium Access Control (MAC) and Physical Layer (PHY) Specifications, Mar. 29, 2012, 2793 pages.

IEEE 802.11a Part 11: Wireless LAN Medium Access Control (MAC) and Physical Layer (PHY) specifications, High speed Physical Layer in the 5 GHz band (8802-11:1999/Amd 1:2000(E)), Jun. 12, 2003, 91 pages.

* cited by examiner

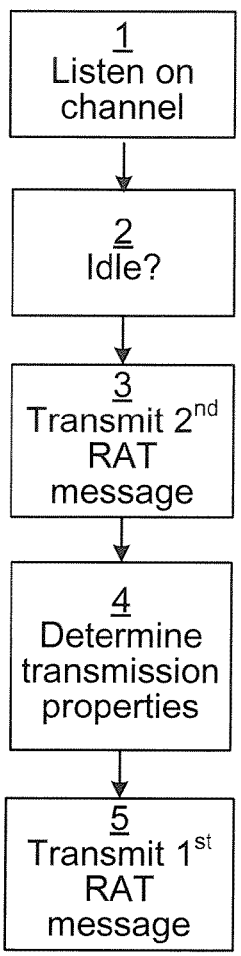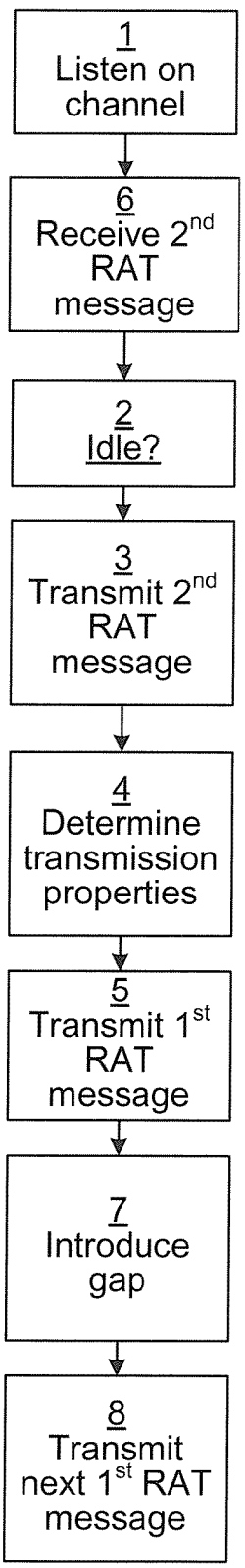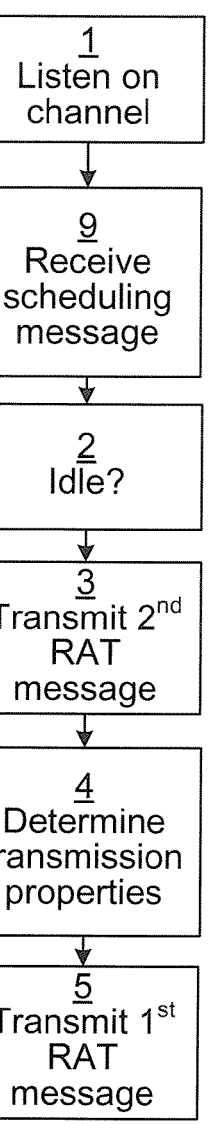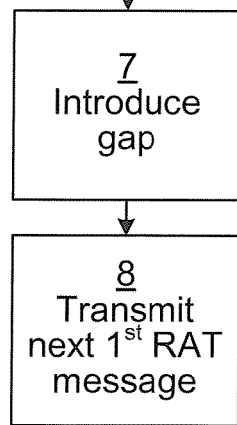
Fig. 7
Fig. 8
Fig. 9

RADIO COMMUNICATION IN UNLICENSED BAND

CROSS-REFERENCE TO RELATED APPLICATIONS

This application claims priority under 35 U.S.C. §119 to European Patent Application No. 13151496.0, filed Jan. 16, 2013, which is hereby incorporated herein by reference in its entirety. This application also claims the benefit of U.S. Provisional Application No. 61/766,942, filed Feb. 20, 2013, which is hereby incorporated herein by reference in its entirety.

TECHNICAL FIELD

The present disclosure relates to a method and a radio device for communication with a second radio device in an unlicensed frequency band.

BACKGROUND

The unlicensed 2.4 GHz industrial, scientific and medical (ISM) band allows for communication between wireless devices under certain restrictions on output power etc. The 5 GHz ISM band has also restriction on output power and also requirements for sensing other transmissions and backoff if a transmission is detected.

The Institute of Electrical and Electronics Engineers (IEEE) 802.11 WLAN standard operates on the license free ISM bands on 2.4 GHz and 5 GHz.

The Distributed Coordination Function (DCF) is the fundamental access method in 802.11 and must be supported by all WLAN user equipment (UE), here also called stations. The DCF requires all stations to contend for access to the channel for each packet transmitted.

Packet transmissions are separated by gaps between subsequent frames called Inter Frame Spaces (IFS). There are different gap durations resulting in several priority classes used by different types of frames. The 802.11a standard [IEEE 802.11a Part 11: Wireless Local Area Network (WLAN) Medium Access Control (MAC) and Physical Layer (PHY) specifications-Amendment 1: High-speed Physical Layer in the 5 GHz band (8802-11:1999/Amd 1:2000(E))] defines three IFS as shown in Table 1.

TABLE 1

Timing relations between Inter Frame Spaces

| Inter Frame Space | Duration |
| --- | --- |
| Short Inter Frame Space (SIFS) | 16 µs |
| DCF Inter Frame Space (DIFS) | 36 µs |

Stations waiting a SIFS or a PIFS period of time automatically have priority over stations waiting a DIFS.

The DCF is the basic access method of the IEEE 802.11 MAC protocol and is working on a best effort basis supporting asynchronous data traffic. The protocol used in the DCF is the Carrier Sense Multiple Access with Collision Avoidance (CSMA/CA).

Carrier sensing, part of the Clear Channel Assessment (CCA) [IEEE 802.11-2007 Part 11: Wireless LAN Medium Access Control (MAC) and Physical Layer (PHY) Specifications], detects the presence of other stations or other devices transmitting on the channel. Before transmitting a frame, the station must sense the channel and identify it as idle for at least a DCF Inter Frame Space (DIFS) period of time. If the channel is identified to be idle during the whole DIFS the packet can be transmitted, but otherwise the station must generate a backoff time randomly within an interval (known as the Contention Window (CW)) corresponding to a number of time slots. The backoff timer should only start being decremented when the channel has been detected as idle for a DIFS time. For every idle time slot, the backoff timer should be decremented by one, but if the channel is detected as busy, the timer must be frozen until the channel has been detected as idle for at least a DIFS time. When the backoff timer reaches zero the frame is transmitted.

DCF adopts an exponential backoff scheme called slotted binary exponential backoff. For every scheduled retransmission the station uniformly chooses a timer value measured in time slots within the CW. Every consecutive retransmission of a packet causes the CW to be doubled within the valid range [CWmin, CWmax]. The IEEE 802.11 standard defines the backoff time as follow:

Backoff Time=Random( )×SlotTime

Random( )=Pseudo random integer drawn from a uniform distribution over the interval [0, CW−1], where CW is an integer within the range of values of the CWmin and CWmax, CWmin≤CW≤CWmax SlotTime=The slot time (in µs) that the MAC will use for defining the SIFS, PIFS and DIFS periods. Typical values of the slot time are the slot time for IEEE 802.11a of 9 µs and for IEEE 802.11b of 20 µs.

The collision avoidance part of CSMA/CA tries to minimize the probability of collisions but there will always be a risk of two stations starting their transmission at the same time.

DCF employs an immediate positive acknowledgment scheme to confirm the reception of every data frame, see FIG. 1.

DCF also provides an alternative way of avoiding the high costs associated with each collision. The sender and receiver can exchange special control frames of two types, RTS (Request To Send) and CTS (Clear To Send), prior to the transmission of the actual data frame. A station wanting to transmit a data frame first sends an RTS frame according to the basic access mechanism of DCF. The receiver station upon hearing the RTS control frame waits a SIFS period of time and then responds with a CTS frame, see FIG. 2. If the CTS control frame is perfectly received by the requesting station then the channel is reserved for a data transmission. All the other stations hearing the RTS/CTS exchange update their Network Allocation Vectors (NAV) with the time reservation defined in the RTS/CTS packets. The NAV is a time indicator maintained by each station, of time periods when transmissions should not be initiated.

Wireless standards, like IEEE 802.11 WLAN and Bluetooth (IEEE 802.15.1), that operate on the ISM 2.4 GHz band and ISM 5 GHz band employ certain rules, as exemplified above for IEEE 802.11, in their access to the channel in order to share the wireless channel in a fair way. This means that the channel should not be blocked for longer time periods since that would prevent other wireless terminals from gaining access.

In contrast, a centrally controlled cellular communication system, e.g. a Long Term Evolution (LTE) radio communication system does not consider the need of other stations using another Radio Access Technology (RAT) to access the frequency band. A cellular system operating on an unlicensed band thus blocks the use of other RATs on that band. The cellular system should thus only use channels of an unlicensed band if it has been determined that the channel is not used by any other RAT in that area.

GB 2486926 discloses LTE in channels of an ISM band in addition to regular LTE channels. When sensing transmission from an 802.11 by using a built in WiFi modem, frequency hopping is uses to avoid interference.

2012 IEEE International Symposium on Dynamic Spectrum Access Networks "Mechanisms for LTE Coexistence in TV White Space" by Mihaela Beluri et al. of Inter Digital Communications discloses a high level description of an LTE system operating in license exempt bands. A coexistence gap is used and the LTE station listens for any WLAN communication.

SUMMARY

It is an objective of the present disclosure to provide a method and device for improved radio communication in an unlicensed frequency band, specifically cellular radio communication. For instance, an LTE radio device operating on the ISM band should adhere to a fair channel access method to co-exist with other wireless standards (i.e. RATs). A problem with using LTE on the unlicensed ISM band is the co-existence with IEEE 802.11. Without knowledge of the channel access scheme of IEEE 802.11, the LTE RAT will block an ISM band channel for long periods and create interference for other wireless technologies operating on the ISM band.

According to an aspect of the present disclosure, there is provided a method of a first radio device using a first radio access technology (RAT) for communication with a second radio device. The method comprises listening for any transmission in a frequency channel of an unlicensed radio frequency band. The method also comprises determining whether the channel is idle. The method also comprises transmitting a first radio message on the channel in accordance with a second RAT, different than the first RAT. The method also comprises determining transmission properties for a message to be transmitted on the channel in accordance with the first RAT, based on the determining of whether the channel is idle. The method also comprises transmitting a second radio message on the channel, to the second radio device and in accordance with the first RAT using the determined transmission properties.

According to another aspect of the present disclosure, there is provided a radio device configured for using a first RAT for communication with a second radio device. The device comprises means for listening for any transmission in a channel of an unlicensed radio frequency band. The device also comprises means for determining whether the channel is idle. The device also comprises means for transmitting a first radio message on the channel in accordance with a second RAT, different than the first RAT. The device also comprises means for determining transmission properties for a message to be transmitted on the channel in accordance with the first RAT, based on the determining of whether the channel is idle. The device also comprises means for transmitting a second radio message on the channel, to the second radio device and in accordance with the first RAT.

The radio device of the present disclosure may be used for performing any embodiment of the method of the present disclosure.

According to another aspect of the present disclosure, there is provided a computer program product comprising computer-executable components for causing a radio device to perform an embodiment of a method of the present disclosure when the computer-executable components are run on a processor comprised in the radio device.

In accordance with the present disclosure, radio communication according to the first RAT can be performed in an unlicensed frequency band with a reduced risk of interference with radio communication in that unlicensed frequency band according to the second RAT. By transmitting a message in accordance with the second RAT, the first radio device can make a third radio that is using the second RAT on the unlicensed frequency band for radio communication device aware of its existence.

Generally, all terms used in the claims are to be interpreted according to their ordinary meaning in the technical field, unless explicitly defined otherwise to herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 7 is a schematic flow chart of an embodiment of a method of the present disclosure.

FIG. 8 is a schematic flow chart of another embodiment of a method of the present disclosure.

FIG. 9 is a schematic flow chart of another embodiment of a method of the present disclosure.

DETAILED DESCRIPTION

Figure 1:
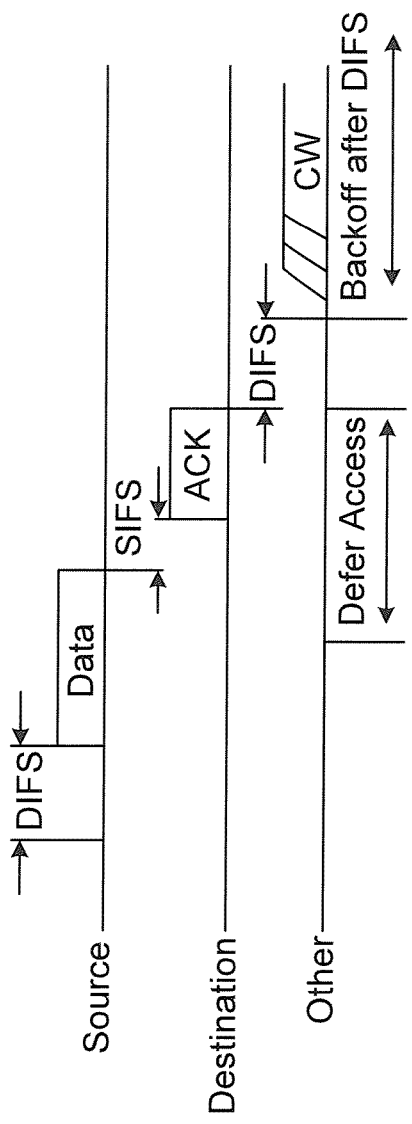
FIG. 1 illustrates transmission of a data frame using DCF in WLAN.
Figure 2:
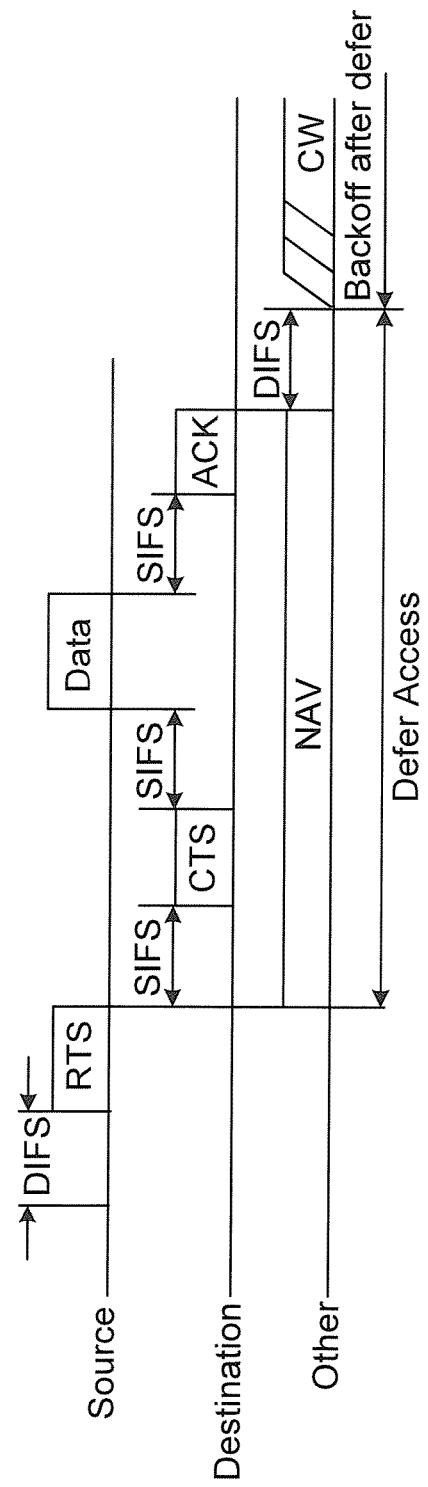
FIG. 2 illustrates transmission of a data frame using RTS/CTS in WLAN.

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Currently there is no support for using e.g. LTE on a license free band, like the ISM band. The present disclosure makes co-existence of e.g. IEEE 802.11 and LTE on the ISM band possible. An LTE radio device, such as a user equipment (UE) or base station (BS), that would like to use the ISM frequency band may first perform a channel measurement to detect if any transmissions are on-going. If the channel is found idle, then the LTE transmission can be initiated. In accordance with the present disclosure, a message, e.g. the channel reservation mechanism (RTS/CTS) specified in the IEEE 802.11 standard, can be used prior to the LTE transmission to alert any other device(s) which may use the unlicensed frequency band that the LTE transmission will take place.

If the channel is found busy, a restricted LTE transmission may be performed. This transmission may use a lower transmission power or/and a more robust coding/modulation scheme. It is assumed that the robustness of LTE and the retransmission capabilities will facilitate a successful reception. Another option after detecting an on-going transmission is to defer from initiating an LTE transmission and wait until the channel becomes idle.

The second radio message (e.g. an LTE transmission) may be a data message specifically intended for the second radio device, or it may be a more general message, e.g. a broadcast or multicast message.

A new LTE transmission might not be started immediately following a previous LTE transmission. Instead the new transmission may be delayed k time slots. This feature may be needed to allow IEEE 802.11 devices to use the channel in-between LTE transmissions. The number of time slots to wait may be fixed, e.g. use Multimedia Broadcast Multicast Service (MBMS) subframes, or chosen from a random distribution or be a function of the number of detected IEEE 802.11 transmissions.

In 3GPP release 8 for LTE, the Common Reference Signal (CRS) is always on, even if there is no user data to transmit. This may result in unwanted interference. Therefore, the LTE transmission may be on a secondary carrier, on a lean carrier or on a carrier with reduced CRS power (Physical Downlink Shared Channel (PDSCH) transmission with Demodulation Reference Signals (DMRS)), in order to improve coexistence.

The first radio device may be any radio device able to communicate by using the first RAT as well as by using the second RAT. Such communication includes listening for transmissions of each RAT and being able to send messages using either of the RATs. The first radio device may e.g. be a UE or a BS such as an LTE evolved Node B (eNB). Similarly, the second radio device is any radio device able to communicate by using the first RAT, and the third radio device is any radio device able to communicate by using the second RAT. Any UE radio device may be any device, mobile or stationary, enabled to communicate over a radio cannel in a communications network, for instance but not limited to e.g. mobile phone, smart phone, modem, sensors, meters, vehicles, household appliances, medical appliances, media players, cameras, or any type of consumer electronic, for instance but not limited to to television, radio, lighting arrangements, tablet computer, laptop, or personal computer.

There are several possibilities for a radio device, e.g. an LTE radio device, to enter connected mode in a radio communication system, e.g. an LTE system, that operates in an ISM band. A first alternative, based on the Third Generation Partnership Program (3GPP) release 8 procedures, is that an ordinary synchronization procedure and random access are performed. The radio device listens to and synchronizes to the specific transmitted synchronization signal that is present in e.g. LTE. Then the radio device detects the cell id and reads the broadcast channel. Finally, it sends a random access signal, possibly after it has made sure that there is no traffic from other systems, e.g. WLAN or Bluetooth, in the frequency band. It is then in connected mode. A second alternative is based on the 3GPP release 10 Carrier Aggregation (CA) procedures and the radio device is capable of carrier aggregation. In that case, the primary carrier may be in a licensed band and the secondary carrier may be in an ISM band. The radio device performs the regular connection procedures in the primary carrier. From the base station it is then signalled that it should switch to the secondary carrier and the radio device is hence connected in the ISM band.

In accordance with the present disclosure, two different RATs are allowed to co-exist in an unlicensed frequency band. The first RAT may e.g. be a RAT of a cellular communication system such as a High Speed Packet Access (HSPA), Wideband Code Division Multiple Access (WCDMA) or LTE communication system, and the second RAT may be a Local Area Network (LAN), an ad hoc network such as Bluetooth or any other communication system which is adapted for residing in an unlicensed frequency band. It is also contemplated that more than two RATs co-exist in the frequency band by means of the present disclosure, e.g. an LTE RAT as first RAT may co-exist with both WLAN and Bluetooth as second and third RATs. in this case, steps of the method of the present disclosure relating to the second RAT may be performed also for the third or further RAT. The unlicensed frequency band may e.g. be an ISM band.

The method of the present disclosure can be used to reduce interference with a third radio device using the second RAT for communication on the frequency channel of the unlicensed band. However, it is also contemplated that the method can be used also for alerting any third radio device without there actually being any such third radio device.

The transmission properties are the properties by which a message can be transmitted on a frequency channel in an unlicensed frequency band using the first RAT. In some embodiments of the present disclosure, the transmission properties include any of the properties of the group consisting of transmission power, allocation bandwidth, modulation and code rate, for the transmitting of a radio message using the first RAT. If it has been determined that the frequency channel is not idle, the determining of transmission properties may in some embodiments comprise adjusting said properties to reduce the risk of interference with transmissions which are sent in accordance with the second RAT, e.g. from the third radio device. In some embodiments, the adjusting comprises reducing the transmission power, adjusting the allocation bandwidth, reducing the modulation and/or reducing the code rate. By means of some or all of these adjustments, the risk of interference with transmissions sent in accordance with the second RAT can be reduced and/or the robustness of the transmissions in accordance with the first RAT can be increased to counter any interference from second RAT transmissions.

Additionally or alternatively, in some embodiments, if it has been determined that the frequency channel is not idle, the transmitting of the second message (which is in accordance with the first RAT) is deferred for a period of time. Thus, the transmission of the second message does not interfere with on-going transmissions in accordance with the second RAT. In some embodiments, the method further comprises receiving a message in accordance with the second RAT, wherein the period of time for which the transmission is deferred is determined based on said received message. The received message may e.g. be an RTS or CTS WLAN message.

In some embodiments, the method further comprises introducing a transmission gap on the channel after having transmitted the second message. The transmission gap may allow other transmissions to be sent on the frequency channel, e.g. transmissions in accordance with the second RAT, without interference. In some embodiments, the method may then further comprise transmitting a third radio message on the channel in accordance with the first RAT, after the transmission gap. After the transmission gap, the transmission in accordance with the first RAT may be recommenced. This pattern may then be repeated as needed, with multiple sequential transmissions in accordance with the first RAT separated by transmission gaps for allowing transmissions in accordance with the second RAT on the same channel.

As mentioned above, the first radio device may in some embodiments be a UE, whereby the second radio device may e.g. be a BS or a second UE (in case of device-to-device (D2D) communication). In some embodiments, when the first radio device is a UE, the method further comprises receiving a scheduling message in accordance with the first RAT. Based on this received scheduling message, the second message may then be transmitted when the UE is scheduled for uplink (UL) transmission according to the received scheduling message. The scheduling message may be received from the second radio device, e.g. a BS to which the UE is connected.

Alternatively, the first radio device may in some embodiments be a BS, e.g. an eNB, in which case the second radio device may e.g. be a UE or a second BS. Thus, in some embodiments, the first radio device is a BS of a cellular communication system such as LTE or HSPA/WCDMA.

The second RAT, as mentioned above, may e.g. be a RAT according to an Institute of Electrical and Electronics Engineers (IEEE) standard, such as a Wireless Local Area Network (WLAN) RAT or a Bluetooth RAT. The third radio device may thus e.g. be a WLAN access point (AP) or any radio device able to communicate via WLAN with such an AP.

In some embodiments, the first message (sent in accordance with the second RAT, in this case WLAN) is a WLAN Request to Send (RTS) or Clear to Send (CTS) message. By means of these messages, the first radio device may indicate to the third radio device, and any other device(s) using the second RAT, that it intends to transmit on the channel, allowing them to avoid interference.

Figure 3:
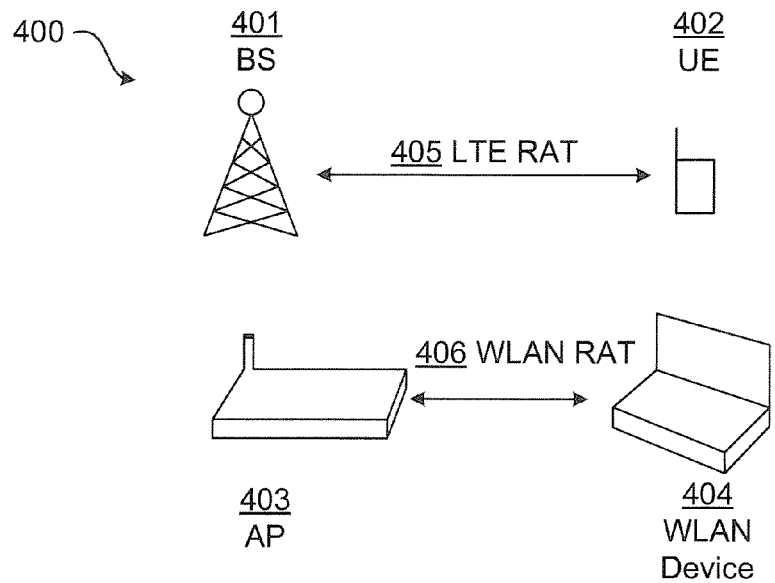
FIG. 3 schematically illustrates an embodiment of a cellular communication system of the present disclosure, operating in proximity of a WLAN communication system.

FIG. 3 schematically illustrates a scenario in with embodiments of the present disclosure may be used. A UE 402 is connected to a BS 401 of a cellular communication system 400 using an LTE RAT 405. At the same time, a WLAN device 404 e.g. a laptop is connected to an AP 403 using a WLAN RAT 406. In this scenario, and using the terminology used herein, the first and second radio devices are either of the BS 401 and the UE 402, and the third radio device is either of the AP 403 and the WLAN device 404. The first RAT is the LTE RAT 405 and the second RAT is the WLAN RAT 406. If the radio devices 401-404 are in proximity of each other and attempt to transmit on the same (unlicensed) frequency channel at the same time using the two different RATs 405 and 406, there is a risk of interference between the transmissions. This risk is alleviated by means of embodiments of the present disclosure.

Figure 4:
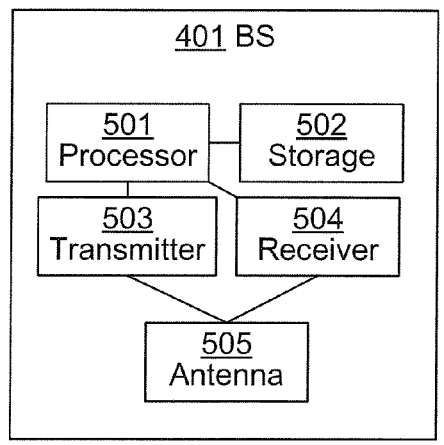
FIG. 4 is a schematic block diagram of an embodiment of a base station radio device of the present disclosure.

FIG. 4 schematically illustrates an embodiment of an BS 401 of the present disclosure. The BS 401 comprises a processor 501 e.g. a central processing unit (CPU). The processor 501 may comprise one or a plurality of processing units in the form of microprocessor(s). However, other suitable devices with computing capabilities could be comprised in the processor 501, e.g. an application specific integrated circuit (ASIC), a field programmable gate array (FPGA) or a complex programmable logic device (CPLD). The processor 501 is configured to run one or several computer program(s) or software stored in a storage unit 502 e.g. a memory. The storage unit is regarded as a computer readable means and may e.g. be in the form of a Random Access Memory (RAM), a Flash memory or other solid state memory, or a hard disk. The processor 501 is also configured to store data in the storage unit 502, as needed. The BS 401 also comprises a transmitter 503, a receiver 504 and an antenna 505, which may be combined to form a transceiver or be present as distinct units within the BS 401. The transmitter 503 is configured to cooperate with the processor to transform data bits to be transmitted over a radio interface to a suitable radio signal in accordance with the radio access technology (RAT) used by the Radio Access Network (RAN) via which the data bits are to be transmitted. The receiver 504 is configured to cooperate with the processor 501 to transform a received radio signal to transmitted data bits. The antenna 505 may comprise a single antenna or a plurality of antennas, e.g. for different frequencies and/or for MIMO (Multiple Input Multiple Output) communication. The antenna 505 is used by the transmitter 503 and the receiver 504 for transmitting and receiving, respectively, radio signals.

Figure 5:
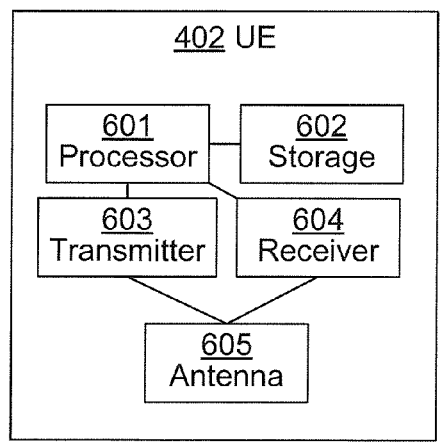
FIG. 5 is a schematic block diagram of an embodiment of a user equipment radio device of the present disclosure.

FIG. 5 schematically illustrates an embodiment of the first radio device of the present disclosure, here in the form of a UE 402. The UE 402 comprises a processor or central processing unit (CPU) 601. The processor 601 may comprise one or a plurality of processing units in the form of microprocessor(s). However, other suitable devices with computing capabilities could be used, e.g. an application specific integrated circuit (ASIC), a field programmable gate array (FPGA) or a complex programmable logic device (CPLD). The processor 601 is configured to run one or several computer program(s) or software stored in a storage unit or memory 602. The storage unit is regarded as a computer readable means and may e.g. be in the form of a Random Access Memory (RAM), a Flash memory or other solid state memory, or a hard disk. The processor 601 is also configured to store data in the storage unit 602, as needed. The UE 402 also comprises a transmitter 603, a receiver 604 and an antenna 605, which may be combined to form a transceiver or be present as distinct units within the UE 402. The transmitter 603 is configured to cooperate with the processor to transform data bits to be transmitted over a radio interface to a suitable radio signal in accordance with the RAT used by the RAN via which the data bits are to be transmitted. The receiver 604 is configured to cooperate with the processor 601 to transform a received radio signal to transmitted data bits. The antenna 605 may comprise a single antenna or a plurality of antennas, e.g. for different frequencies and/or for MIMO (Multiple Input Multiple Output) communication. The antenna 605 is used by the transmitter 603 and the receiver 604 for transmitting and receiving, respectively, radio signals.

Figure 6:
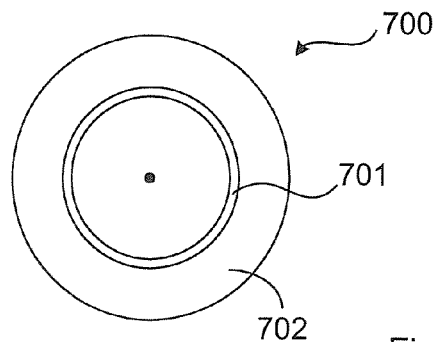
FIG. 6 is a schematic illustration of an embodiment of a computer program product of the present disclosure.

FIG. 6 illustrates an embodiment of a computer program product 700 of the present disclosure. The computer program product 700 comprises a computer readable medium 702 comprising a computer program 701 in the form of computer-executable components 701. The computer program/computer-executable components 701 may be configured to cause a radio device, e.g. a BS 401 or UE 402 as discussed above, for communication with a second radio device in an unlicensed frequency band, to perform an embodiment of the method of the present disclosure. The computer program/computer-executable components may be run on the processing unit 501 or 601 of the radio device 401 or 402 for causing the device to perform the method. The computer program product 700 may e.g. be comprised in a storage unit 502 or 602 or memory comprised in the device and associated with the processing unit. Alternatively, the computer program product 700 may be, or be part of, a separate, e.g. mobile, storage means, such as a computer readable disc, e.g. CD or DVD or hard disc/drive, or a solid state storage medium, e.g. a RAM or Flash memory.

FIG. 7 is a schematic flow chart illustrating an embodiment of a method of the present disclosure. The method is performed by the first radio device 401 or 402 using the first RAT 405 for communication with a second radio device 401 or 402. The radio device listens 1 for any transmission in a frequency channel of an unlicensed radio frequency band, e.g. performing a measurement on said channel. Based on this listening 1, the radio device determines 2 whether the channel is idle. The radio device transmits 3 a first radio message on the channel in accordance with a second RAT 406, different than the first RAT 405 and used on the channel by a third radio device 403 or 404. If the second RAT is WLAN, the first radio message may e.g. be an RTS or a CTS message. Alternatively, it can be any message, transmitted only to allow the third radio device to become aware of the first radio device. The transmitting 3 of the first message may be performed before, concurrently or after the determining 2 of whether the frequency channel is idle. The radio device determines 4 transmission properties for a message to be transmitted on the channel in accordance with the first RAT 405, based on the determining 2 of whether the channel is idle. If the channel is determined 2 not to be idle, the radio device may e.g. determine 4 transmission properties which results in lower transmission power to reduce interference with other transmissions and/or which results in a more robust transmission to cope with expected interference from other transmissions. The determining 4 of transmission properties may be performed before, concurrently or after the transmitting 3 of the first radio message. Then, the radio device transmits 5 a second radio message on the channel, to the second radio device 401 or 402 and in accordance with the first RAT 405 using the determined 4 transmission properties. Thus, the second radio message is transmitted 5 in accordance with the first RAT and in accordance with the determined 4 transmission properties.

FIG. 8 is a schematic flow chart illustrating another embodiment of a method of the present disclosure. The listening 1 for any transmission, the determining 2 of whether the channel is idle, the transmitting 3 of the first radio message, the determining 4 of transmission properties and the transmitting 5 of the second radio message are as discussed with reference to FIG. 7. According to the embodiment of FIG. 8, a message in accordance with the second RAT is received 6 by the first radio device before the second message is transmitted 5. Based on the received 6 message, the first radio device may be able to determine when the frequency channel will be idle, and thus when to transmit 5 the second message. For instance, if it has been determined 2 that the channel is not idle, the first radio device may determine, based on the received 6 message, a period of time with which the transmitting 5 of the second message is to be deferred.

Further, in the embodiment of FIG. 8, a transmission gap is introduced 7 on the frequency channel after having transmitted 5 the second message, and a third radio message is transmitted 8 on the channel in accordance with the first RAT 405, after the transmission gap. By this, other transmissions, e.g. transmissions by the third radio device in accordance with the second RAT, may be sent on the frequency channel without being interfered by the first radio device transmissions.

FIG. 9 is a schematic flow chart illustrating another embodiment of a method of the present disclosure. The listening 1 for any transmission, the determining 2 of whether the channel is idle, the transmitting 3 of the first radio message, the determining 4 of transmission properties and the transmitting 5 of the second radio message are as discussed with reference to FIG. 7. According to the embodiment of FIG. 9, the first radio device is a UE 402 and the UE receives 9 a scheduling message in accordance with the first RAT 405, before the transmitting 5 of the second message. The scheduling message may e.g. be received 9 from the second radio device which may be a BS 401. The second message may then be transmitted 5 when the UE is scheduled for UL transmission according to the received 9 scheduling message.

EXAMPLES

Embodiments of the present disclosure are here exemplified with the first RAT 405 being an LTE RAT and the second RAT 406 being a WLAN RAT. The first radio device, which thus is an LTE radio device, may be a BS 401, e.g. a macro, micro, pico or femto BS, or a UE 402.

It is assumed that the LTE first radio device itself may perform some or all of the described operations of the examples below, or that a secondary IEEE 802.11 transceiver unit associated with the first radio device may be used.

In the first case, the first radio device is LTE-capable, but is configured to do a minimum necessary subset of the 802.11 procedures, sufficient to an embodiment of the method of the present disclosure. This type of device is thus not necessarily capable of maintaining a WLAN connection.

In the second case, a secondary WLAN transceiver may be already existing in (or added to) the device, and can thus be utilized to perform the signalling using the second RAT 406.

Below follows two example embodiments of the method; one for initiating a new LTE transmission, and one for initiating a subsequent LTE transmission. After these embodiments follow examples of how they are applied to the UE 402 or BS 401 sides.

Example 1

Initiating a New LTE Transmission

Figure 10:
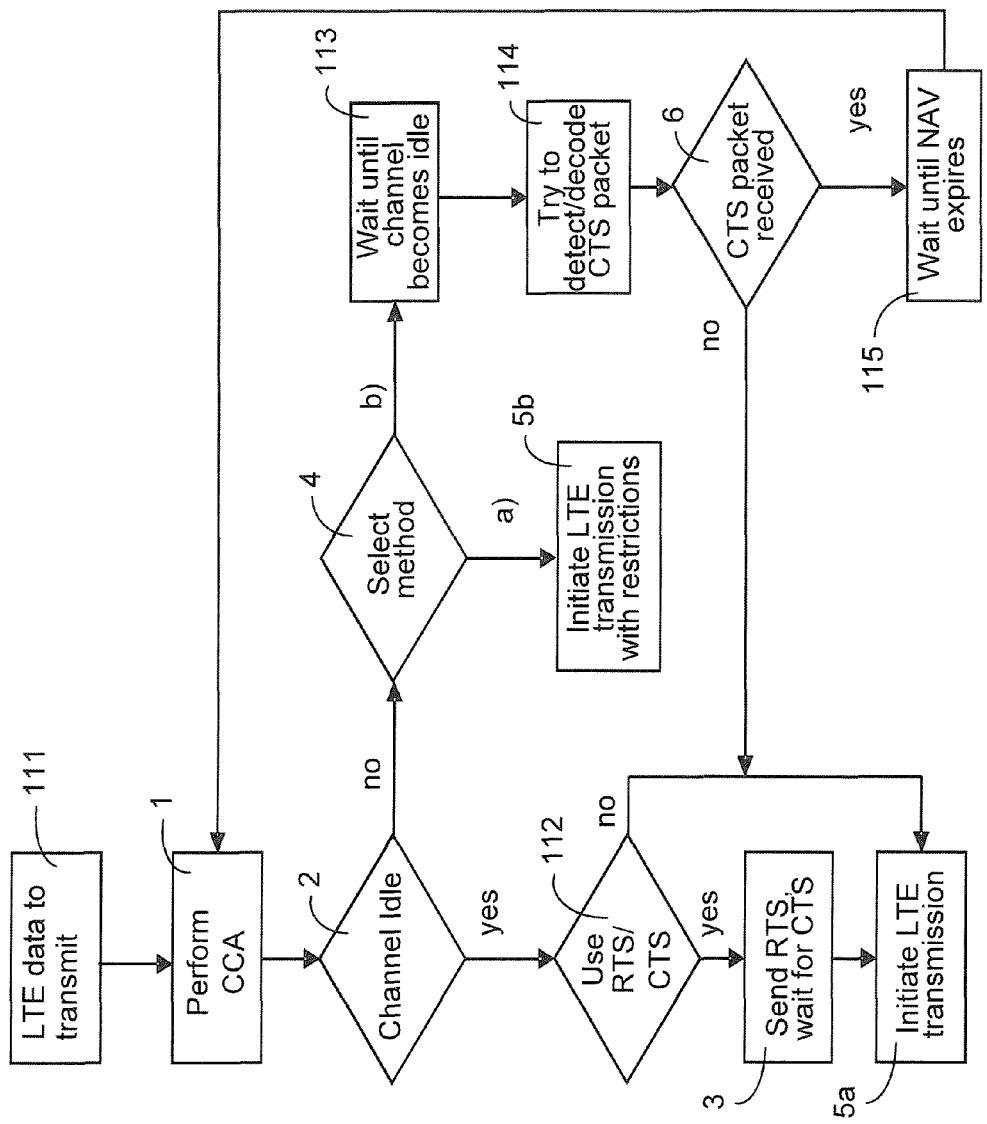
FIG. 10 is a schematic flow chart of another embodiment of a method of the present disclosure.

FIG. 10 illustrates an embodiment of example 1.

1) The first radio device listens 1 for transmissions by performing a Clear Channel Assessment (CCA) on the unlicensed band.

2) If the channel is determined 2 to be idle:
  a. Initiate the LTE transmission, by transmitting 3 an RTS/CTS (if it has been chosen 112 to use RTS/CTS) prior to the data transmission 5a.

3) If the channel is determined 2 to be busy, do a. or b. below (e.g. as part of determining 4 the transmission properties for the data transmission 5) depending on priority of the LTE transmission 5, and choice of fairness to the WLAN system.

a. Transmit 5b the LTE second radio message with additional restrictions. The restrictions may include at least reduced power (even no power, i.e. muting) and/or increased robustness (transport format). The power backoff and/or transport format change can be a function of the measured signal power on the ISM band. The robustness and Hybrid Automatic Repeat Request (HARQ) in LTE may still lead to a successful reception. In the no power case the LTE transmission 5a relies on the retransmission functionality in LTE in order to successfully finish the transmission.

b. Defer 113 temporarily from initiating the LTE transmission 5 and continue to monitor the channel and try to detect and decode 114 a CTS packet.

Following the WLAN standard, if a CTS transmission is received 6, detected and decoded, the initiating of the LTE transmission 5 is deferred 115 for the duration specified in the CTS packet (update the NAV), or the transmission 5 is deferred 113 until next start of an LTE subframe (or just before so that the CCA can be performed 1 before the LTE subframe starts). When the time duration has elapsed go to 1).

The choice between a. and b. above can be static, or be dynamically updated so that all UEs 402 and RAT:s 405 and 406 get a fair amount of the spectrum resources. This can e.g. be implemented by means of a counter keeping track of the number of times the first radio device has operated in the different modes (a. or b.).

Example 2

Initiating a Subsequent LTE Transmission

Figure 11:
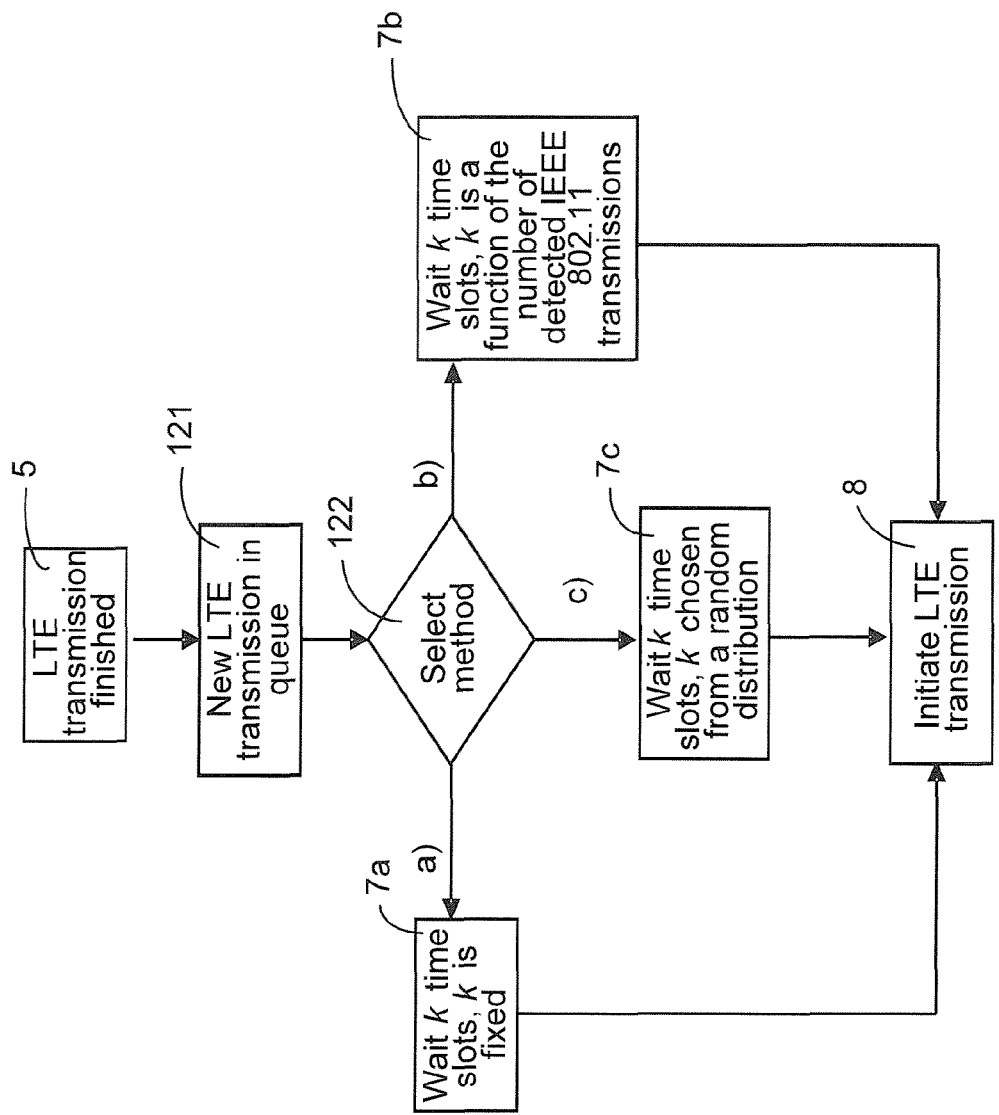
FIG. 11 is a schematic flow chart of another embodiment of a method of the present disclosure.

FIG. 11 illustrates an embodiment of example 2.

In this example embodiment, the LTE system 400 will introduce (step 7) transmission gaps for allowing IEEE 802.11/WLAN transmissions.

1) The first radio device listens 1 for transmissions by performing a Clear Channel Assessment (CCA) on the unlicensed band, and if the channel is determined 2 to be idle:

a. Initiate the LTE transmission, by transmitting 3 an RTS/CTS (if it has been chosen 112 to use RTS/CTS) prior to the data transmission 5.

2) After completing the transmission 5 of the LTE second radio message, wait 7 at least k time slots before transmitting 8 the LTE third radio message. The value of k can be fixed, e.g. wait 7a k time slots where k is fixed, (e.g. by utilizing Multicast-Broadcast Single Frequency Network (MBSFN) or Discontinuous Transmission/Discontinuous Reception (DTX/DRX) cycles) and determined a priori or be a function of the number of WLAN 406 transmissions detected (e.g. wait 7b k time slots where k is a function of the number of detected IEEE 802.11 transmissions) or be chosen from a random distribution, e.g. wait 7c k time slots where k is chosen from a random distribution. The delay time may additionally or alternatively be a fixed to one or several LTE subframes. One LTE subframe is e.g. 111 time slots, here after k is indicating a delay either in LTE subframes or WLAN time slots. One may base the selection of k on one or several of the following factors: (i) the load of the LTE system 400; (ii) the detected activity (e.g. when listening 1 on the unlicensed band) by systems other than the LTE system 400, e.g. WLAN or Bluetooth, (iii) the quality of service requirements of the services running in the LTE system 400 on the channel of the unlicensed frequency band. E.g., if a real-time service, such as voice over IP, is running on the frequency channel in the LTE system 400, then k may be given a low value either by choosing a fixed low value, or by taking a randomized value for k in an interval where the maximum value is low, e.g. one or two LTE subframes. If a delay tolerant service, such as FTP, is running in the LTE system over the frequency channel, then the value of k can typically be higher and more strongly adapted to the detected IEEE 802.11/WLAN transmissions.

Before transmitting 8 the LTE third radio message, the first radio device may, after having waited k time slots, again listen for transmissions in the frequency channel of the unlicensed radio frequency band and/or transmit a radio message, e.g. RTS/CTS, in accordance with the second RAT.

Example 3

UL Transmission (the First Radio Device is a UE 402)

UL transmission follows what is described above, with the additional restriction that the transmission 5 is restricted to when the UE is scheduled to transmit in uplink.

For example, the BS 401 sends control info received 9 by the UE as a scheduling message, that the UE should transmit in 4 ms. After 4 ms, the UE 402 listens 1 to the frequency channel and determines 2 that there is on-going transmission as above. Depending on whether the channel busy or free, the UE can either use full effect, reduced effect or be silent (as per the determining 4 of transmission properties). If one of the two last options is used, then the UE relies on the LTE MAC protocol, e.g., later retransmissions, to make sure that the message is successfully transmitted 5. The choice can be depending on the type of transmission, e.g. an ACK/NAK transmission with a lower number of bits can have a higher priority (power). The backoff is not limited to a certain number of steps, since the pilots can also be varied accordingly.

For transmitting RACH (random access channel), the UE 402 decides when to transmit 5, and follows what is written in the example embodiments above.

Example 4

DL Transmission (the First Radio Device is a BS 401)

With the first radio device operating as a BS 401 on a 3GPP release 8 LTE carrier/frequency band, the Common Reference Signal (CRS) must always be transmitted. The BS 401 decides to a large extent by itself when to transmit 5, and does not need to have the extra 4 ms requirements as in the UE case of example 3. ACK/NAK in downlink (DL) is time aligned with the corresponding uplink packet, thus the ACK/NAK may have a higher priority as described above.

There are some options for solving problems with the interference created by the continuous CRS transmission. Lowering the CRS power can be achieved by setting rho_a and rho_b, see 3GPP 36.213. To lower the CRS power even more, the PDSCH transmission can be restricted to Quadrature Phase Shift Keying (QPSK) modulation. To be able to increase the modulation, the BS 401 can ramp up the CRS power to normal CRS power level during a number of subframes.

Broadcast Control Channel (BCH) and sync can be transmitted with lower power, since they are only phase modulated.

The issues here with the requirements on continuous CRS transmission will to large extent be solved by using lean carriers, since then CRS transmission is disabled in most subframes.

Below follow some other aspects of the present disclosure.

According to an aspect of the present disclosure, there is provided a radio device configured for using a first RAT for communication with a second radio device. The device comprises receiver circuitry for listening for any transmission in a channel of an unlicensed radio frequency band. The device also comprises processor circuitry for determining whether the channel is idle. The device also comprises transmitter circuitry for transmitting a first radio message on the channel in accordance with a second RAT, different than the first RAT and used on the channel by a third radio device. The device also comprises processor circuitry for determining transmission properties for a message to be transmitted on the channel in accordance with the first RAT, based on the determining of whether the channel is idle. The device also comprises transmitter circuitry for transmitting a second radio message on the channel, to the second radio device and in accordance with the first RAT.

According to another aspect of the present disclosure, there is provided a radio device configured for using a first RAT for communication with a second radio device. The device comprises a processor, and a storage unit storing instructions that, when executed by the processor, cause the device to listen for any transmission in a channel of an unlicensed radio frequency band. The instructions also cause the device to determine whether the channel is idle. The instructions also cause the device to transmit a first radio message on the channel in accordance with a second RAT, different than the first RAT and used on the channel by a third radio device. The instructions also cause the device to determine transmission properties for a message to be transmitted on the channel in accordance with the first RAT, based on the determining of whether the channel is idle. The instructions also cause the device to transmit a second radio message on the channel, to the second radio to device and in accordance with the first RAT.

According to another aspect of the present disclosure, there is provided a computer program for a first radio device configured for using a first RAT for communication with a second radio device. The computer program comprises computer program code which is able to, when run on a processor of the first radio device, cause the device to listen for any transmission in a channel of an unlicensed radio frequency band. The code also causes the device to determine whether the channel is idle. The code also cause the device to transmit a first radio message on the channel in accordance with a second RAT, different than the first RAT and used on the channel by a third radio device. The code also cause the device to determine transmission properties for a message to be transmitted on the channel in accordance with the first RAT, based on the determining of whether the channel is idle. The code also causes the device to transmit a second radio message on the channel, to the second radio device and in accordance with the first RAT.

According to another aspect of the present disclosure, there is provided a computer program product comprising an embodiment of a computer program of the present disclosure, and a computer readable means on which the computer program is stored.

The present disclosure has mainly been described above with reference to a few embodiments. However, as is readily appreciated by a person skilled in the art, other embodiments than the ones disclosed above are equally possible within the scope of the present disclosure, as defined by the appended patent claims.

The invention claimed is:

1. A method of a first radio device using a first radio access technology (RAT) for communication with a second radio device, the method comprising:
listening for any transmission in a frequency channel of an unlicensed radio frequency band;
determining whether the channel is idle;
transmitting a first radio message on the channel in accordance with a second RAT, different than the first RAT;
determining transmission properties for a message to be transmitted on the channel in accordance with the first RAT, based on the determining of whether the channel is idle; and
transmitting a second radio message on the channel, to the second radio device and in accordance with the first RAT using the determined transmission properties,
wherein when it has been determined that the channel is not idle, the determining of transmission properties comprises adjusting said properties to reduce the risk of interference with transmissions in accordance with the second RAT, wherein the adjusting comprises any one or more of reducing the transmission power, reducing the modulation, and reducing the code rate.

2. The method of claim 1, wherein a third radio device uses the second RAT for communication on the frequency channel.

3. The method of claim 1, wherein the transmission properties include any of the properties of a group consisting of transmission power, allocation bandwidth, modulation and code rate.

4. The method of claim 1, wherein when it has been determined that the channel is not idle, the transmitting of the second message is deferred for a period of time.

5. The method of claim 4, further comprising:
receiving a message in accordance with the second RAT, wherein the period of time is determined based on said received message.

6. The method of claim 1, further comprising:
introducing a transmission gap on the channel after having transmitted the second message; and
transmitting a third radio message on the channel in accordance with the first RAT, after the transmission gap.

7. The method of claim 1, wherein the first radio device is a user equipment (UE), and the method further comprises:
receiving a scheduling message in accordance with the first RAT;
wherein the second message is transmitted when the UE is scheduled for uplink (UL) transmission according to the received scheduling message.

8. The method of claim 1, wherein the first radio device is a base station (BS) of a cellular communication system.

9. The method of claim 1, wherein the first RAT is a cellular RAT.

10. The method of claim 1, wherein the second RAT is a RAT according to an Institute of Electrical and Electronics Engineers (IEEE) standard.

11. The method of claim 10, wherein the first message is a WLAN Request to Send (RTS) or Clear to Send (CTS) message.

12. A radio device configured for using a first radio access technology (RAT) for communication with a second radio device, the device comprising:
- means for listening for any transmission in a channel of an unlicensed radio frequency band;
- means for determining whether the channel is idle;
- means for transmitting a first radio message on the channel in accordance with a second RAT, different than the first RAT;
- means for determining transmission properties for a message to be transmitted on the channel in accordance with the first RAT, based on the determining of whether the channel is idle; and
- means for transmitting a second radio message on the channel, to the second radio device and in accordance with the first RAT,
- wherein when the means for determining transmission properties determines that the channel is not idle, the determining of transmission properties comprises adjusting said properties to reduce the risk of interference with transmissions in accordance with the second RAT, wherein the adjusting comprises any one or more of reducing the transmission power, reducing the modulation, and reducing the code rate.

13. A nontransitory computer-readable storage medium comprising computer-executable components for causing a first radio device to perform a method when the computer-executable components are run on a processor comprised in the first radio device, wherein the method is for using a first radio access technology (RAT) for communication with a second radio device, the method comprising:
- listening for any transmission in a frequency channel of an unlicensed radio frequency band;
- determining whether the channel is idle;
- transmitting a first radio message on the channel in accordance with a second RAT, different than the first RAT;
- determining transmission properties for a message to be transmitted on the channel in accordance with the first RAT, based on the determining of whether the channel is idle; and
- transmitting a second radio message on the channel, to the second radio device and in accordance with the first RAT using the determined transmission properties,
- wherein when it has been determined that the channel is not idle, the determining of transmission properties comprises adjusting said properties to reduce the risk of interference with transmissions in accordance with the second RAT, wherein the adjusting comprises any one or more of reducing the transmission power, reducing the modulation, and reducing the code rate.

* * * * *